United States Patent [19]

Emerson

[11] 4,321,775
[45] Mar. 30, 1982

[54] GREENHOUSE CONSTRUCTION

[76] Inventor: Hiram J. Emerson, Rte. 5, Box 106C, Jennings Rd., Statesville, N.C. 28677

[21] Appl. No.: 46,329

[22] Filed: Jun. 7, 1979

[51] Int. Cl.³ .............................................. E04B 1/346
[52] U.S. Cl. ....................................... 52/66; 52/169.6; 52/169.7; 47/17
[58] Field of Search ............... 52/66, 64, 169.6, 169.7; 47/17; 49/331; 4/498; 126/425

[56] References Cited

U.S. PATENT DOCUMENTS

| | | |
|---|---|---|
| 795,984 | 8/1905 | Julian . |
| 1,121,722 | 12/1914 | Fessenden . |
| 1,887,815 | 11/1932 | Marshall . |
| 2,639,550 | 5/1953 | McKee .................................. 47/17 |
| 2,639,551 | 5/1953 | McKee .................................. 47/17 |
| 2,777,253 | 1/1957 | Bensin .................................. 47/1 |
| 3,209,373 | 10/1965 | Meredith et al. ................... 52/66 X |
| 3,389,502 | 6/1968 | Leurent .............................. 49/402 X |
| 3,461,605 | 8/1969 | Stanhope ............................. 47/17 |
| 3,475,868 | 11/1969 | Johnson .................................. 52/2 |
| 3,766,691 | 10/1973 | Ray ..................................... 4/498 X |
| 3,938,284 | 2/1976 | Broadbent et al. ..................... 52/20 |
| 4,014,133 | 3/1977 | Brown .................................... 47/17 |
| 4,018,213 | 4/1977 | Mann, Jr. ............................. 47/17 X |
| 4,158,356 | 6/1979 | Wininger ............................. 126/425 |
| 4,196,544 | 4/1980 | Davis et al. ............................ 47/17 |

Primary Examiner—Price C. Faw, Jr.
Assistant Examiner—Carl D. Friedman
Attorney, Agent, or Firm—Schwartz, Jeffery, Schwaab, Mack, Blumenthal & Koch

[57] ABSTRACT

A subterranean structure particularly adapted for greenhouse use and including a roof which can entirely close the enclosure or be moved to a position exposing the interior to natural light. Curtain assemblies are provided at the free end and sides of the roof to eliminate wind, rain or snow from entering the enclosure. Artificial light fixtures are mounted on the underside of the roof for providing artificial light when the roof is closed, and ventilation and supplemental heating means are provided to achieve the desired growing conditions in the greenhouse.

16 Claims, 6 Drawing Figures

GREENHOUSE CONSTRUCTION

BACKGROUND OF THE INVENTION

The invention relates, as indicated, to greenhouse construction, and more particularly to a novel greenhouse construction which is entirely subterranean except for the provision of a hinged roof which can be elevated as desired to admit natural light into the interior of the greenhouse during appropriate light conditions. By selective opening or closing of the roof, complete photoperiodic control of the greenhouse can be obtained at all times of the year thereby avoiding shading of the crop as currently is done. At the same time, substantial energy savings are realized due to the subterranean installation of the greenhouse. Critical night temperatures can be established and maintained, either by residual heat contained in the greenhouse during the opening of the roof during the day, or by providing an additional source of heat to augment such residual heat. Artificial light in the form of light fixtures mounted on the underside of the roof also function as a heat source. In addition, a solar collector can be employed with the roof structure to further supplement the heat energy necessary to maintain the desired temperature conditions within the greenhouse.

The concept of storing vegetables and other food products subterraneally is of course well known in the art. U.S. Pat. No. 795,984 discloses an early teaching of storing fruits and vegetables in caves or tunnels under ground, with a door being provided to gain access to the cave. U.S. Pat. No. 3,938,824 discloses a root cellar which can be fabricated and then buried, with only the top wall being exposed above the ground. The purpose of the cellar is similarly to permit storage of foods, and the structure disclosed in this patent is clearly incapable of sustaining a year round greenhouse operation.

U.S. Pat. Nos. 2,639,550 and 2,639,551 disclose greenhouse constructions which are entirely above ground, but which are provided with translucent curtains or sheets which are mounted for movement by rollers for movement to desired positions relative to the top of the greenhouse construction.

The use of solar heat for building structures is of course well known in the art, with U.S. Pat. No. 2,777,253 disclosing a solar system specifically adapted to a greenhouse environment. However, the solar system is substantially different than contemplated in accordance with the present invention.

The concept of providing a slidable or liftable closure member or roof for a greenhouse in order to expose the interior thereof is also known in the art, reference being made to U.S. Pat. No. 4,014,133. However, the arrangement disclosed in this patent is totally unlike the roof construction and mounting in accordance with the present invention.

SUMMARY OF THE INVENTION

The principal objectives and advantages of the present invention are the substantial savings in fossil fuel consumption, simultaneously with the ability to produce a quality greenhouse product. Engineering studies to date indicate that energy usage in the amount of only approximately 15% of normal usage can be achieved in accordance with the invention. The energy savings, where fossil fuels are used, are accomplished as a result of the following:

1. There is a substantial reduction of heat loss at night due to the inherent insulation characteristics provided by the subterranean installation and the consequent reduced exposure. As those skilled in the art will realize, night temperatures are critical to crop quality and production, and the maintaining of night temperatures at uniform, desired levels is a continuing problem for installations having normal glass greenhouse construction. Even if the critical night temperatures can be reasonably maintained, the energy costs in doing so are very high particularly in the cold seasons in northern latitudes.

2. By installing the greenhouse under ground, the north side wall is entirely eliminated, and the northern roof exposure is insulated. In accordance with the invention, the greenhouse is preferably oriented east to west, with the greenhouse having a roof which preferably hinged being on the north side of the exposure so as to provide maximum exposure to sunlight.

3. The ability to control the exposure of the plants to sunlight, which is normally offset by the heat loss during daytime inclement weather. In accordance with the present invention, during some daylight hours it may be more feasible and desirable to operate with the roof entirely closed, thereby using the artificial light. Alternatively, the roof can be partially opened to provide some degree of natural light, which can be augmented by artificial light. In any event, the exposure of the sidewalls, and thus the interior of the greenhouse, to natural light can be easily controlled.

4. The essential feature of this subterranean installation is the ability to use the stable temperature of the earth, with the ability to increase or decrease the temperature as necessary. Despite the stabilizing greenhouse affect, cooling may be necessary during periods of warm temperature. Likewise, during cold seasons, particularly in northern latitudes, supplemental heat may be necessary to provide the desired temperature. In either event, the energy costs in connection with providing the minor amounts of cooling or supplemental heat necessary are a small fraction of the energy costs required with glass greenhouses.

5. By virtue of the closable roof, the heat energy derived from the greenhouse affect during daylight hours is consumed during the artificial light cycle at night. This provides a very efficient combination in terms both of energy consumption and providing optimum conditions for plant growth.

There are numerous and significant additional advantages afforded by the present invention, as follows:

1. By providing better and essentially precise control over night temperatures, more accurate production scheduling of crops is permitted. In addition, there is no crop delay or loss from low winter temperatures during severe weather, or crop delay or loss from high summer night temperatures. By closing the top during summer periods, the night temperatures can be more easily and efficiently reduced by mechanical cooling means.

2. A 12-hour day/night cycle can be achieved with precision simply by controlling the closure of the roof. This permits production of photoperiodic crops, such as chrysanthemums, without necessarily requiring artificial lighting, and eliminating the need for shading.

3. By utilizing artificial light in the winter, the growing time can be easily extended to 12 hours. The light source not only provides the necessary lighting but also serves as an additional heat source, thereby fully utilizing the light energy. In addition, carbon dioxide can be added as desired to achieve the necessary levels for optimum crop production.

4. The subterranean installation of the greenhouse substantially reduces the risk from storm damage. A principal concern to a glass greenhouse operator is damage due to snow, hail, wind, etc. The ability to entirely close and seal the roof of the underground greenhouse installation essentially eliminates these problems. Preferably, the greenhouse is provided with pressure sensors which are actuated at predetermined wind levels to automatically close the roof to preclude damage to the roof or other parts of the greenhouse exposed when the roof is partially or entirely raised. The essentially total insulation from storm damage permits a greatly reduced or total elimination of the need for insurance against structural loss, and eliminates the possibility of crop loss, for which insurance is essentially not available. The reduction of these risks and costs has the additional advantage of permitting capital requirements to be more closely estimated and obtained, without the need for factoring in the loss of crops or greenhouse structure.

5. In view of the essentially total control of the growth environment in the greenhouse, watering, fertilization, heating, cooling, etc. can be more regularly controlled and even computerized in order to reduce the human error factor in crop production. The accurate control of production necessarily means optimum crop production per square foot of greenhouse, thereby optimizing profits.

6. The substantial reduction in estimated energy costs permits production of crops near to the consuming market. At the present time, horticultural crops are predominantly produced in warmer climates and then transported to the largest markets, which in the United States comprise the East Coast and the Northern tier of industrial states. By greatly decreasing the energy costs, the installation of subterranean greenhouses in accordance with the present invention are feasible essentially at any location whereby the local market can be supplied at a reduced cost. This is a particularly important with the marked increase in foreign competition which has an advantage both from the standpoint of labor costs and beneficial climate.

7. The problem of shading, particularly in summer conditions, is greatly reduced. When operating on a 12-hour day/night cycle, summer shading may be necessary, due to light intensity, but the shading is limited to the exposed areas at the sides and open end of the roof. The shading requirements can be met by employing preferably plastic curtains positioned between the roof and the top of the enclosure. The curtains can be sufficiently dark to inherently provide shading, or shading can be applied to translucent curtains. Where curtain assemblies are employed, in accordance with the preferred mode of the present invention, means such as flaps or openings be provided in the curtains for admitting air therethrough to the greenhouse interior.

A further more specific feature of the invention is to provide a relatively simple arrangement for raising the roof to the desired angle for the admission of light, and to provide an effective seal at the juncture of the roof and the supporting wall construction of the greenhouse. In accordance with the invention, the roof is beveled at the sides and end opposite to the hinged end thereof, with the beveled edges seating on complementary beveled edges provided on the tops of the end wall and side walls of the greenhouse, thereby providing a tight and sealed joint when the roof is closed. Artificial light, preferably in the form of florescent light fixtures, are mounted on the underside of the roof so as to provide artificial light during periods when the roof is in a closed position. Sensing means are preferably provided for actuating the artificial light source, if necessary, when the roof is raised to provide the desired foot-candle light intensity in the interior of the greenhouse.

A further feature of the invention resides in the provision of a preferably plastic curtain attached to the sides and free end of the roof, with the curtain being extended as the roof is raised. The curtains are flexible and transluscent so that light can be transmitted therethrough into the interior of the structure when the roof is open but serving as a barrier to wind and weather. The plastic curtains are preferably supported by tensioned, spaced wires to increase the support for the curtains, which fold when the roof is lowered into storage troughs.

A still further feature of the invention is the provision of ventilating means for circulating ambient air through the interior of the greenhouse. Access openings are formed in the earth for admitting and exhausting the ventilating air, and the source of supplemental heat can be employed in conjunction with the ventilation system for providing heated air to the enclosure.

Yet another feature of the invention is the concept of constructing the greenhouse in modules. Each module is essentially self-contained, that is, is fully operable in and of itself, and a series of such modules can be provided to achieve a greenhouse of the desired dimensions. Each module has an independently hinged roof and means for raising and lowering the roof, with a typical dimension for the roof of each module being eight feet wide and approximately thirty-five feet long. If more than one module is employed, supporting means are of course necessary in the interior regions of the modules not supported by the outside walls of the structure.

These and other objects of the invention will be apparent to those skilled in the art as the following description proceeds and particular reference to the application drawings.

BRIEF DESCRIPTION OF THE APPLICATION DRAWINGS

DETAILED DESCRIPTION OF THE PREFERRED EMBODIMENTS

Figure 1:
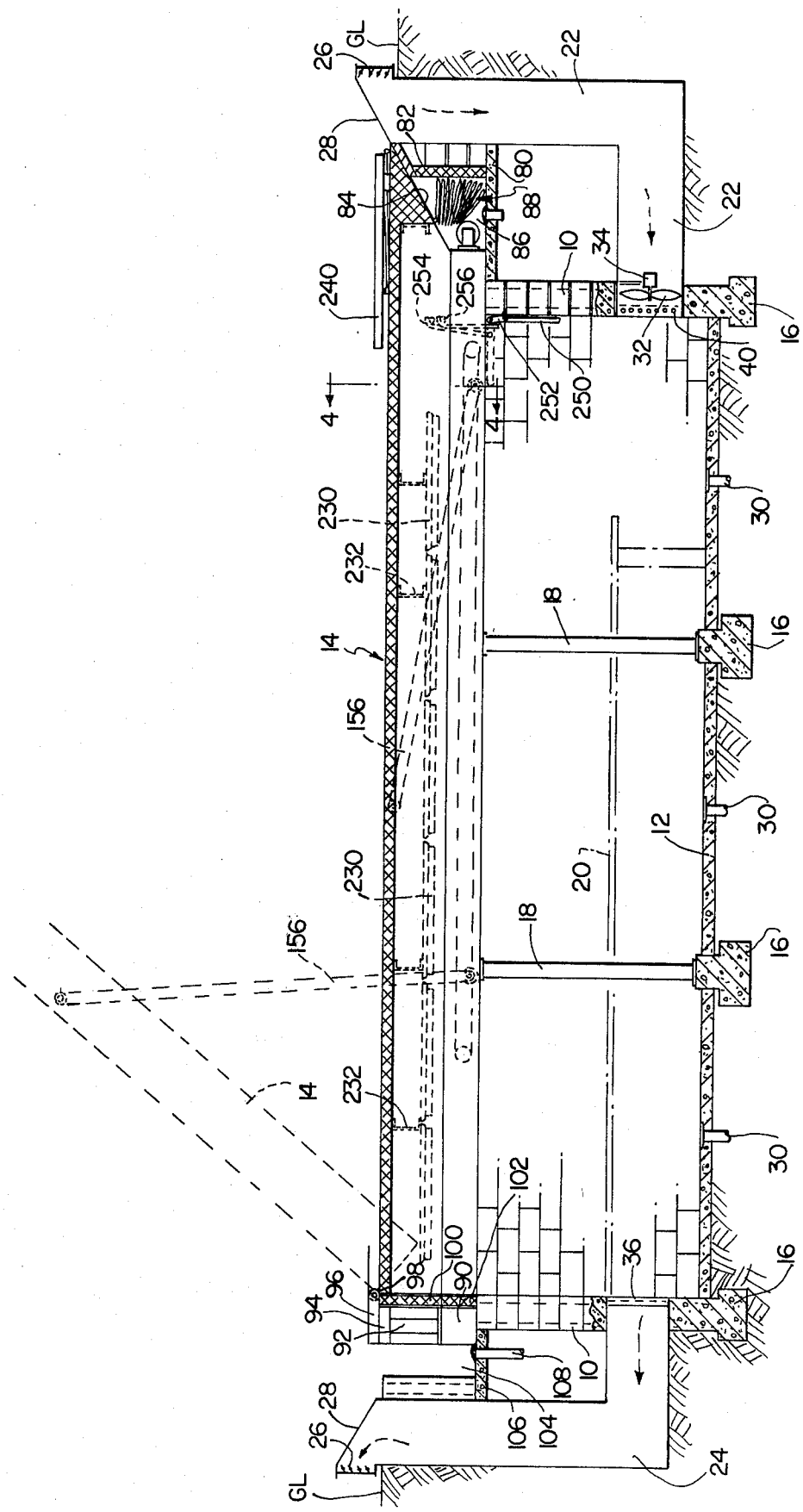
FIG. 1 is a longitudinal cross-sectional view of the greenhouse construction, with the roof being shown in solid lines in closed position, and dashed lines in raised position.
Figure 2:
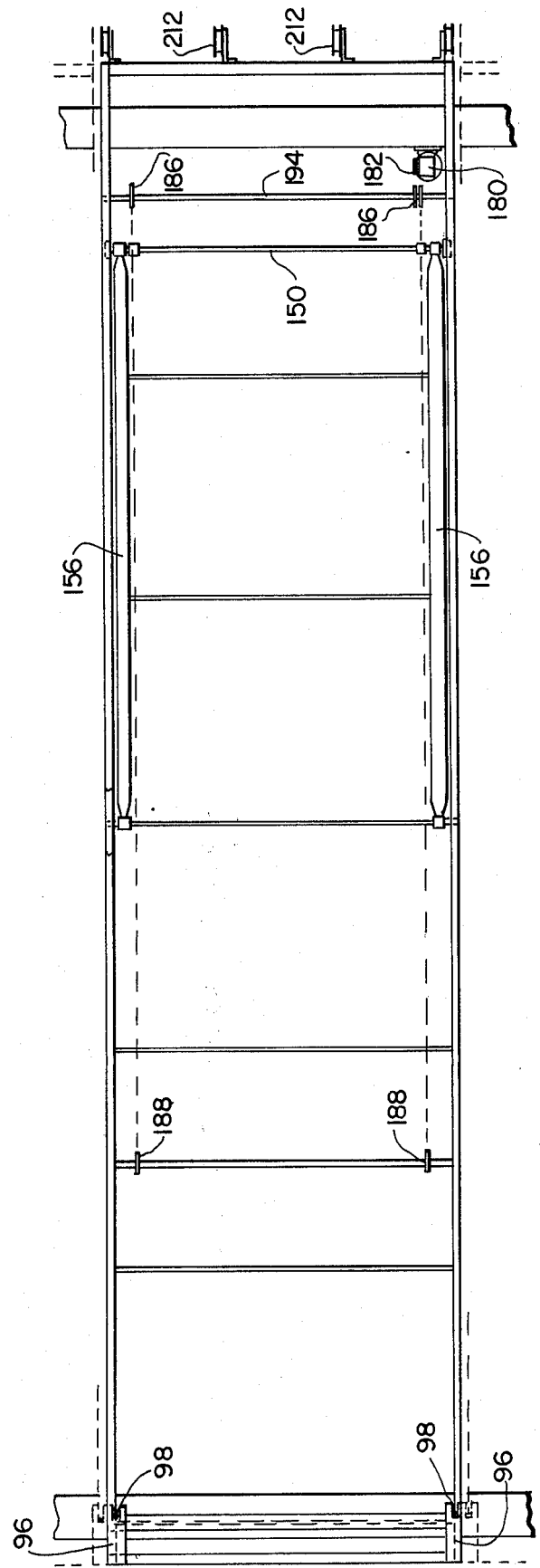
FIG. 2 is a top plan view of the structure, with the top surface of the roof being removed in order to illustrate more clearly the framing structure and the lifting mechanism for the roof.

Referring now in more detail to the drawings, wherein like parts are indicated by like reference numerals, and initially to FIGS. 1 and 2, the greenhouse includes four walls, commonly designated at 10 and a floor 12, preferably of poured concrete. The walls may be formed of any suitable material, for example, concrete block, with the blocks preferably containing reinforcing bars in the regions thereof which support the roof, which is generally indicated at 14.

Concrete abutments commonly designated at 16 are provided where necessary to support loading, with interior pipes commonly designated at 18 being provided as supports where more than one module is employed. As above noted, the greenhouse construction is preferably of modular construction, with a typical and preferred module being eight feet in width and approximately thirty-five feet in length. If only one module is used, the block walls tend to serve as the sole support for the top frame and roof assembly. Where two or more modules are placed side by side, reference being made to FIG. 3, for example, pipe or post columns 18 are provided to support the roof and frame structure at the interior of the greenhouse.

Figure 3:
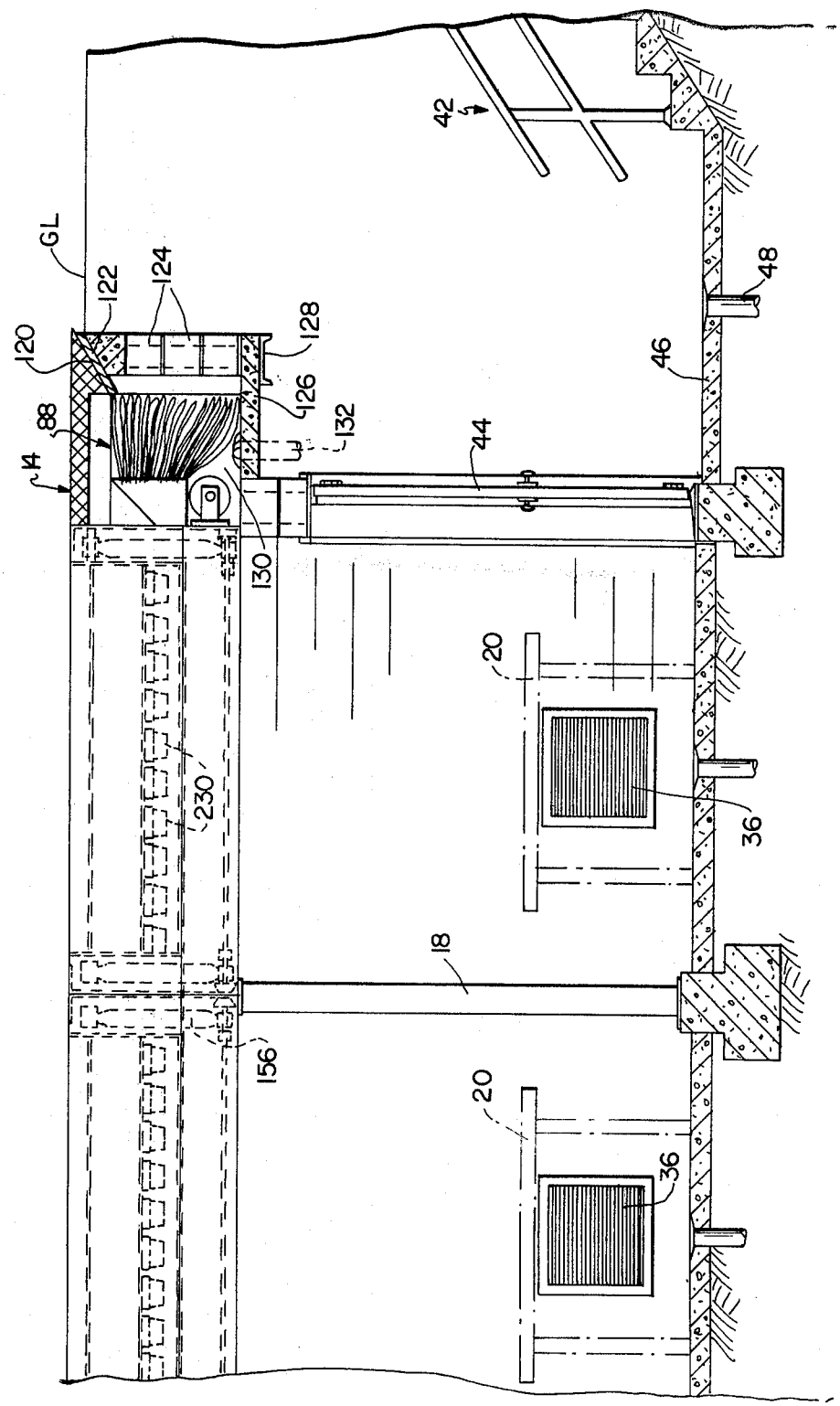
FIG. 3 is an end elevational view, partly in section, of the greenhouse construction, with two modules being illustrated, one fragmentarily, and an entrance to one of the modules.

It will be seen in FIGS. 1 and 3 that the top of the roof 14 is generally at ground level GL, with the greenhouse therefore being entirely subterranean except for those instances in which the roof 14 is raised.

Work benches typical of those provided in above ground greenhouse constructions are shown schematically at 20, and can be situated as desired within the enclosure.

Ventilating air is provided for each module by providing an inlet duct 22 for admitting ambient air to the enclosure, and an exhaust duct 24 for venting the air back to the atmosphere. A grate shown diagramatically at 26 is preferably provided at the inlet and outlet ends of the ducts, covered by shrouds or hoods 28 which serve to prevent moisture or precipitation from entering the ventilation chambers. The grates 26 can be made of a plastic material with vent flaps which are self-sealing in order to prevent the back flow of air from or into the enclosure. This is a particularly desirable feature for the outlet grate during low ambient temperature conditions. In order to provide upward circulation of the ambient air, the lower end of the outlet duct 24 can be elevated relative to the position thereof shown in FIG. 1. This will prevent air stagnation in the region immediately below the roof, and thus enhance removal of hot air near the roof.

A series of drains commonly designated at 30 are installed in the floor 12, and can be connected to a common drainage line (not shown) in a well known manner.

A fan 32 operated by a motor 34 is mounted in the end of the duct 22 for drawing in ambient air and circulating the same through the enclosure. A grate 36 is mounted at the inlet of the exhaust duct 24. If desired, a filter can be provided adjacent the fan 32 at the ambient air entrance for filtering the ambient air.

A principle advantage of the present invention is being able to capture and retain solar heat entering the enclosure during the day when the roof 14 is raised. Ideally, the retention of such heat is sufficient to maintain night temperatures. However, it is recognized that at certain times of the year additional heat may be necessary at night to maintain minimum temperature requirements. One source of such heat can be an electrical resistance element, shown at 40 in FIG. 1. As shown, the element is positioned adjacent the fan 34 whereby the ambient air is heated and circulated through the enclosure. Other forms of heat could alternatively be provided, depending on the types of energy available at a particular geographic location.

FIG. 3 illustrates an end view of the greenhouse, with stairway 42 providing access to the enclsoure from ground level. A door 44 permits access to the interior of the greenhouse, and the landing 46 is provided with a drain 48. Depending on the number of modules forming the greenhouse construction, more than one entry area can if desired be provided.

Figure 4:
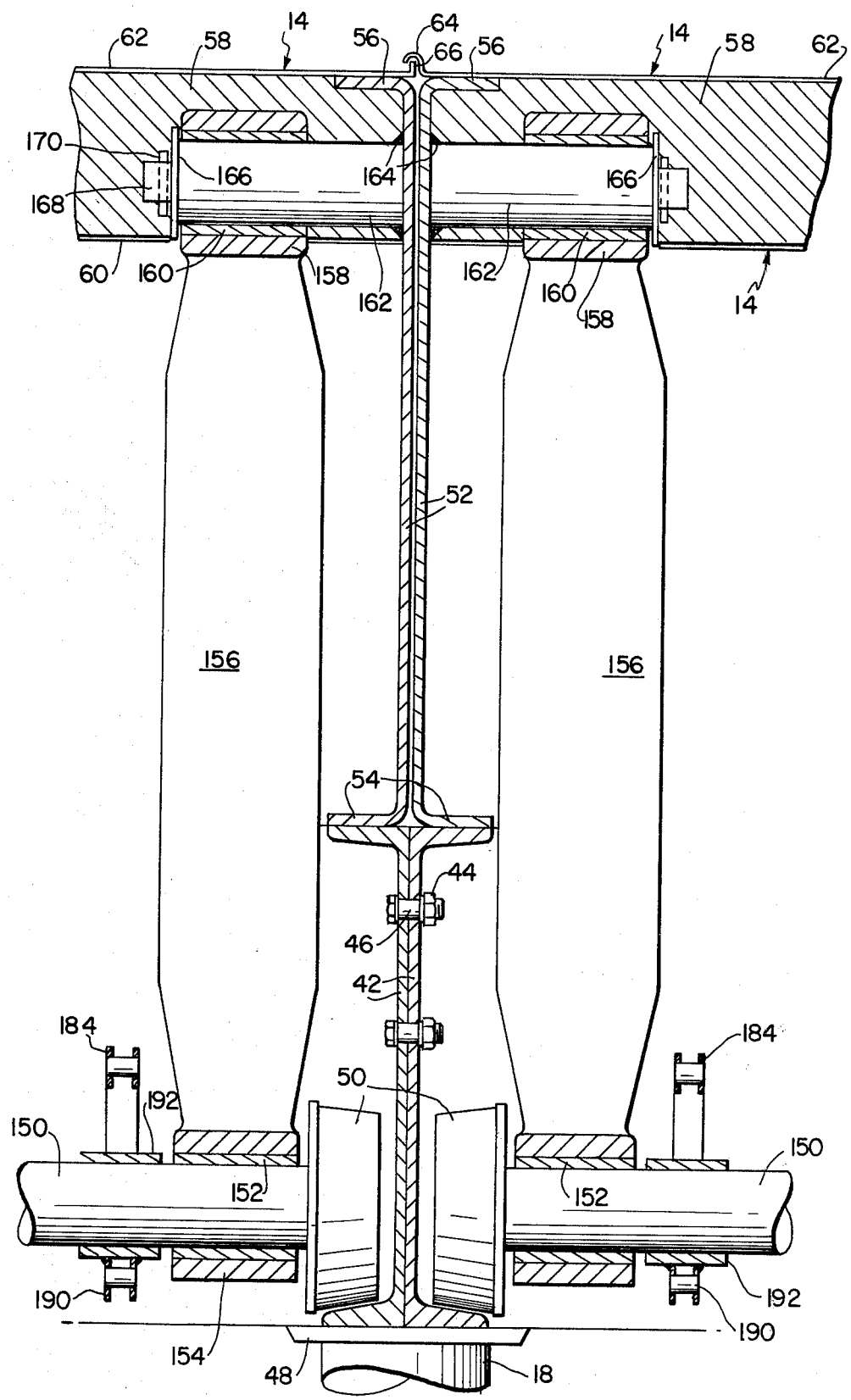
FIG. 4 is a sectional view taken on line 4—4 of FIG. 1, and showing in greater detail the lifting mechanism for the roof sections of adjacent modules.

With regard now to the frame structure of the greenhouse, reference is made to FIG. 4. This is a sectional view taken on line 4—4 of FIG. 1 and shows the roof construction and lifting means therefor at the juncture of adjacent modules, comparable to the juncture shown in FIG. 3. The post 18 supports a pair of angle beams commonly designated at 42 which are secured together by nut and bolt means 44 and 46, respectively, to form a composite I-beam the bottom of which rests on flange 38 positioned at the top of the post 18. The bottom flanges of each beam 42 are tapered as shown to form contact, rolling surfaces for guide rollers commonly designated at 50, which will be referred to in greater detail below. The beams 42 are of sufficient thickness and of such material so as to support the loading from the roof, which loading is transmitted to the posts 18.

Positioned above the composite I-beam formed of beams 42 are angle beams, commonly designated at 52, the bottom legs 54 of which engage and are supported by the top flanges of the beams 42 when the roof is in a closed position. The upper flanges 56 of the beam 52 form part of the roof construction, and are preferably embedded in insulation 58. The insulation can be of any suitable material possessing the necessary strength characteristics, for example, foamed polyurethane, with the insulation being sandwiched between a lower sheet 60 and an upper sheet 62 to form the roof assembly. The sheets 60 and 62 can be formed of any suitable material, for example fiber glass or aluminum. The upper sheet 62 forms the exposed surface for the roof and must therefore be water tight. The lower sheet 60 should also be sealed against dampness from inside the structure. The beams 42 and 52 are preferably of aluminum, which possesses the necessary strength characteristics while at the same time minimizing weight.

As will be seen in FIG. 4, the upper sheets of adjoining roof sections are shaped to provide a seal at the juncture of the sections. Thus, in the roof section shown at the right in FIG. 4, a curved lip 64 is provided which extends upwardly over a projection 66 formed on the adjoining edge of the opposite sheet 62, thereby to provide a weather-tight joint.

Figure 6:
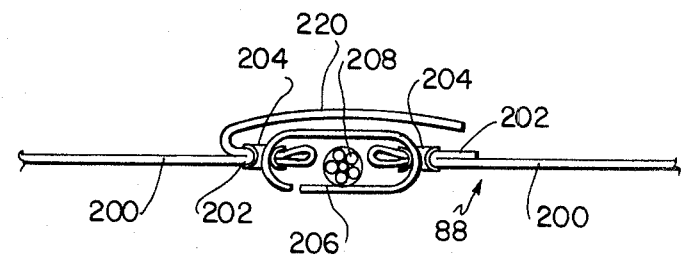
FIG. 6 is a sectional view taken along line 6—6 of FIG. 5, showing in more detail the plastic curtains and supporting means therefor.

The upper supporting structure further comprises a rigid slab 80, preferably concrete, formed outwardly of the block wall and shown at the right end of FIG. 1. Extending upwardly from the slab 80 is a support member 82 which preferably extends the full width of the enclosure, with the upper surface of the support member 82 being beveled as shown to provide a supporting surface for the beveled front edge 84 of the roof section 14. Inwardly of the support member 82 and below the beveled surface 84 of the roof section there is a formed a well 86 into which the curtain assembly generally indicated at 88 can drop when the roof is lowered. The construction of the flexible curtain 88 will be discussed in more detail hereinbelow when particular reference is made to FIGS. 5 and 6.

At the opposite, hinged end of the roof, a block 90 or other rigid supporting member is mounted above the blocks 10 forming the end wall, with the block 90 likewise extending the full width of the module. Additional supporting members, which can comprise, for example, wood or metal beams, and commonly designated at 92 are positioned above the block 90 and likewise extend transversely the full width of the module. A further support member 94 is positioned on top of the transverse members 92, and hinge plates 96, preferably formed of stainless steel, are rigidly secured to the supporting structure at each end thereof, reference being made to FIG. 2. Hinge pins 98 are rigidly secured to the top and rear end of the roof section and extend through openings in the hinge plates 98 to accommodate opening and closing movement of the roof relative to the enclosure. Additional transversely extending support members 100 and 102 are mounted directly below the hinge plates 96 at approximately the hinge axis, with the bottom support member 102 resting on the blocks 10 thereby to transmit the forces directly to the enclosure walls.

Outwardly of the support members 92-96, an opening or well 104 if formed, the botom of which is defined by a concrete slab 106 into which is positioned a drain 108. Each roof section is also beveled at the exterior side thereof, reference being made to FIG. 3. Thus, the roof section 14 is beveled as shown at 120 which engages a plate 122 disposed at a complementary angle to the beveled surface, with the plate 122 in turn being supported by members 124 which may comprise, for example, concrete blocks. The blocks are in turn supported by a concrete slab 126 the outer end of which is supported by an angle beam 128 which extends longitudinally of the module. The beam 128 can be supported at its opposite ends and at intermediate intervals as necessary.

Below the beveled side portion of the roof 14 and inwardly of the supporting structure therefor, a well 130 is provided into which the flexible curtain generally indicated at 88 can drop for storage when the roof is closed. A drain 132 is provided which extends through the slab floor 126 for draining any moisture which may enter the well 130.

Referring back to FIG. 4, the preferred means for lifting the roof sections 14 will now be described in more detail. The previously described rollers 50 are carried on shafts 150 which extend transversely the full width of the module (FIG. 2). As previously explained, FIG. 4 is a sectional view between adjacent modules interior of the enclosure, and it will be understood that similar beam assemblies are provided at the other side of each module, with a similar roller 50 being carried at the opposite end of each shaft 150.

A bearing sleeve 152 is mounted around each shaft adjacent the roller 50, and the lower apertured end 154 of the lifting rod 156 extends around the sleeve 152. The upper end 158 of the rod is similarly apertured and fits around a bearing sleeve 160 which in turn is positioned over stub shaft 162. The latter is welded as shown at 164 to beam members 42 which form the inner end faces of the roof sections 14. The upper mounting of the lifting rod is retained in the position thereof shown in FIG. 4 by a stop washer 166 which fits around a reduced diameter extension 168 of the stub shaft, with a pin 170 extending through an aperture formed in the extension.

It should be noted that FIG. 4 is a view of the described assembly in the closed position of the roof. In such position, however, it will be noted that the lifting rods are inclined upwardly toward the roof sections, as clearly shown in FIG. 1.

When it is desired to raise the roof section, the lower ends of the lifting rods 156 are moved longitudinally toward the hinged end of the roof, by virtue of the rollers 50 traversing the track formed therefor by the bottom flanges of the beam members 42. Since the weight of the roof maintains the rollers in engagement with the beam flanges, the upper ends of the rods are moved vertically toward the open position of the roof shown in dashed lines in FIG. 1.

Any suitable means can be provided for moving the rollers 50 along the track and consequently causing lifting of the roof sections. The form illustrated comprises a drive motor 180 (FIG. 2) the shaft of which drives a sprocket 182 around which are positioned sprocket chains 184, best seen in FIG. 4. Additional sprockets 186 and 188 are shown diagrammatically in FIG. 2. One link 190 of the chain is welded to a sleeve 192 positioned around the shaft 150 inwardly of the bearing sleeve 152, whereby movement of the chain results in movement of the shaft 150 and consequent movement of the lifting rods 156.

Only one motor 180 is shown in FIG. 2 and this will normally sufficient to move the shaft 150. Thus, the sprockets 186 and 188 shown uppermost in FIG. 2 are driven through a connecting shaft 194 which extends between sprockets 186. If necessary due to loading and torque considerations, a separate motor could of course be provided for driving the sprockets 186 and 188 shown uppermost in FIG. 2.

When the roof section 14 is fully raised as shown in FIG. 1, the lifting rods 156 extend almost vertically, and the described chain drive for lifting movement of the rods insures that the rods are maintained in such position. It will be understood that the roof can be raised to any desired angle relative to the horizontal, and maintained in such position. The roof can preferably be tilted open to an angle of up to 50° thereby to permit a substantial amount of light into the greenhouse enclosure.

As above noted, an important feature of the invention resides in the ability to raise the roof sections 14 without, however, subjecting the interior of the greenhouse to weather and wind. Brief reference was made to the foldable flexible curtains 88, and these will now be described in more detail with particular reference to FIGS. 5 and 6. The curtain assemblies comprise individual curtains commonly designated at 200, with a plurality of sections preferably being provided for each module. The ends 202 of each curtain are doubled or otherwise reinforced and extend through grommets 204 which in turn are connected to a snap ring 206. Disposed within the ring is a stranded wire rope 208 the upper end 210 of which is attached to the beveled surface of the roof section 14, and the lower end of which is wound on pulley 212. As seen in FIG. 2, four such pulleys are preferably provided for each module, with each pulley being mounted on brackets 214 attached to the adjacent frame member 216. The pulleys 212 are preferably spring wound so as to provide constant tension on the wire rope 208 during the playout and return of the wire rope. The curtains 200 are preferably provided in widths of approximately three feet, and a plurality of snap rings 206 are mounted along the length of the flexible curtains so as to provide the desired tautness in the curtains the entire length thereof.

A support plate 218 is provided for the lower edge of the curtain, and the manner in which the curtain folds during the closing of the roof is shown in FIGS. 1 and 3 and was referred to above. As seen in FIG. 3, the flexible curtains are neatly stored in the well 30 at the exterior side of the module shown at the right of FIG. 3, and the curtains operatively secured to the front beveled surface of the roof section 14 are likewise neatly stored in the well 86 as shown in FIG. 1. It will be noted that for interior modules, the width of the curtains will extend only the width of the module, and in order to seal the joint between adjacent curtain assemblies, the curtain is folded over as shown at 220 for providing a weather seal at the joint.

The flexible curtains 200 can be made of any material having the necessary light transmission and flexibility characteristics. Preferably, a translucent plastic material is employed, with the plastic being of sufficient strength to withstand wind pressures of up to 30 pounds per square foot (approximately 50 MPH). The material that is selected should be resistant to damage by ultra-violet radiation and should remain flexible at low temperatures. Polyethylene or reinforced polyethylene, acetate, vinyl, mylar and polycarbonates all appear to provide the necessary characteristics required for the curtain material, although the particular type of material forms no part of the present invention. It will be understood that the curtain can be continuous in width, and that means, such as flaps or openings can be provided for admitting air through the curtain into the interior of the greenhouse.

Banks of florescent lighting fixtures, commonly designated at 230, are mounted on the underside of the roof structure by means of brackets 232. The fixtures provide the desired light intensity when the roof is closed. The artificial light may also be used to supplement natural light when the roof is partially or entirely raised, and the fixtures can be spaced as desired and provided in independently controllable banks to provide the desired lighting intensity. A typical installation for each module would comprise 60 four foot light fixtures, which would provide sufficient light intensity on the work benches 20 positioned approximately 6 feet below the fixtures. The wiring for the fixtures is preferably carried to the fixed hinged end of the structure.

Figure 5:
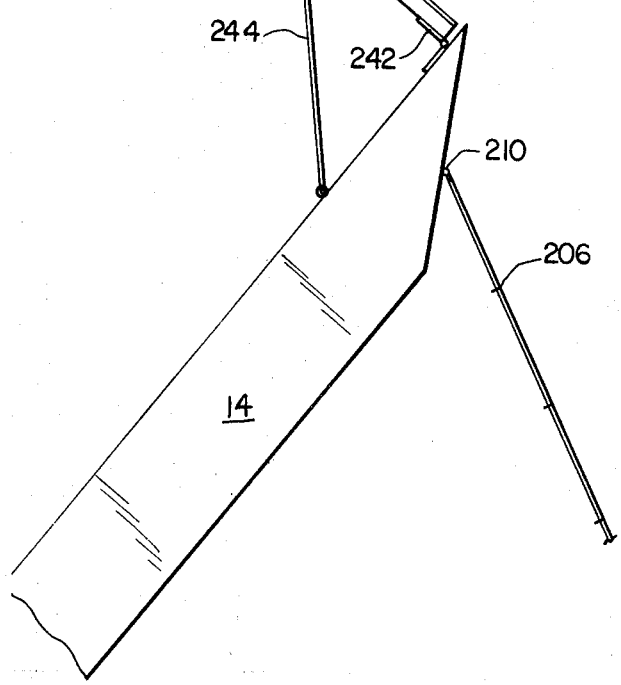
FIG. 5 is a fragmentary view showing a section of the raised roof and adjacent supporting structure, with the curtain in extended position and the solar collector in a raised position from the roof.
Figure 5:
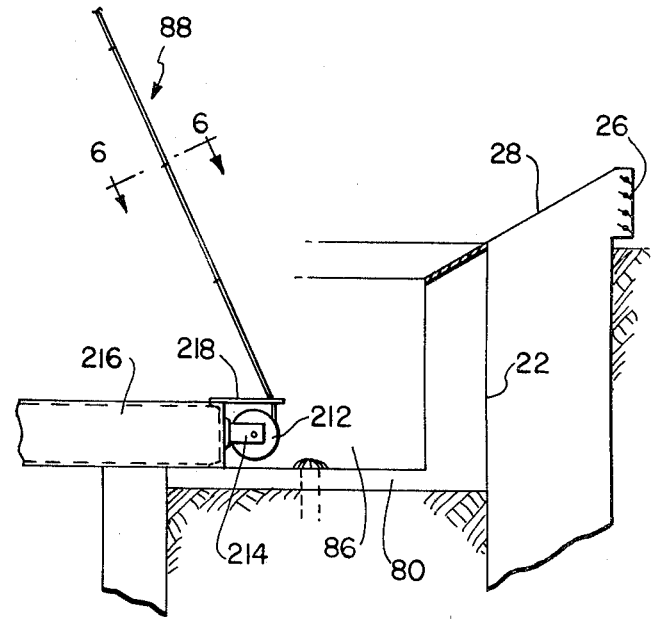

Additional heat can be provided by the use of a solar collector, and the collector is shown schematically at 240 in FIGS. 1 and 5. The collector is hinged at 242 to the upper surface of the roof 14 at the front beveled edge thereof, and a supporting rod 244 is provided for propping up the collector when the roof is raised. Water to be heated can be directed to the collector and heated water passed off the collector, with the hot water being directed to a water circulation or storage system not shown in the application drawings.

In order to retain the roof 14 in its closed position, a latch 250 (FIG. 1) is hinged to a link 252 which in turn is pivotally connected to the wall structure, with the free end of the latch 250 being formed with a curved portion 254 which extends over a pin 256 mounted on the roof 14. In this manner the latch 250 can be raised and the roof secured in its closed position.

It will be understood that additional supporting means will be provided as necessary for the roof structure. These additional supporting members may comprise aluminum channel members extending through the roof section, transversely or longitudinally at spaced intervals. The roof must be designed to support loading as a result of wind pressures against the roof end the plastic curtains described above. It must also be of sufficient weight and structure to support the light fixtures and wiring on the underside of the roof.

Although the drawings and above description relate to a totally designed greenhouse construction, it will be apparent that the roof and other framing components can be mounted on an existing wall structure in an excavation. In this manner, excavation and block wall construction could proceed at several locations followed by the mounting of the roof and other equipment. The beveled surfaces which support the roof could be formed from poured concrete, above the block wall. The roof can be provided in northern latitudes, if necessary, with resistance elements closely adjacent to the beveled surfaces thereof so as to prevent ice formation on the beveled surfaces which would inhibit the closure of the roof.

It will thus be seen that the present invention consists of a highly novel greenhouse construction. The greenhouse enclosure is entirely subterranean, and the roof for the greenhouse can be tilted at the desired angle for admitting natural light. However, in order to negate wind and weather affects on the greenhouse, a novel system of curtain assemblies are provided which extend from the roof to a well area at the front and sides of the roof section. Ventilation means are provided for the greenhouse enclosure, and supplemental heat can be circulated through the enclosure. The roof carries artificial light fixtures so as to provide a source of light when the roof is closed, and a possible supplemental source of light when the roof is partially or entirely open. In this manner the light intensity within the greenhouse can be controlled as desired.

Although the described and illustrated structure is particularly advantageous for a greenhouse operation, it will be apparent that the basic concepts of the invention have broader application. For example, the structure could conveniently be used for residential, commercial or like purposes. Interior partitioning, if desired, could easily be provided. The same advantages of energy conservation would be realized, with the roof when raised providing both heat and light during day conditions. Supplemental heat in the form of solar collectors, electric heat, etc. could be provided if necessary. The subterranean installation, with its natural earth insulation and inherent resistence to wind and other climatic conditions is an obviously energy efficient system. Although the roof is shown hinged in the application drawings, it could alternatively be mounted for sliding movement to partially or entirely expose the interior, or the roof could be raised, thereby providing light on all sides. This latter modification has particular advantages when the structure is used for residential purposes.

I claim:

1. A building structure adapted to be located partially or entirely below the adjacent terrain, comprising:
   (a) wall means defining an enclosure, said wall means being located at least partially below the adjacent terrain;
   (b) frame means positioned above said wall means;
   (c) a roof above said frame means, and when closed, entirely covering said enclosure;
   (d) means for mounting said roof for movement relative to said frame so as to selectively expose said enclosure to natural light, said means for mounting said roof relative to said frame comprising a hinge assembly by means of which said roof can be raised from said frame about an axis through said hinge assembly, (e) means for moving said roof, and (f) curtain means extending between the sides and free end of said roof and points adjacent said frame means, with said curtains, when said roof is raised, providing a wind and weather resistant shield to said enclosure.

2. The building structure of claim 1 wherein said curtain means comprise a plurality of translucent, flexible plastic sections extending transversely at the free end of said roof and longitudinally along the sides of said roof, and means for interconnecting said sections in a weather tight manner.

3. The building structure of claim 2 wherein said interconnecting means comprises a snap ring to which is connected grommet means secured to reinforced side edges of each curtain section, with one of said reinforced edges extending over said ring so as to provide a weather tight seal.

4. The building structure of claim 3 further including reinforcing means in the form of wire strand ropes extending with said rings and thus between adjacent curtain sections, one end of each wire stand rope being secured to said roof, and the opposite end being secured to a pulley mounted on said frame.

5. The building structure of claim 4 wherein said pulley is spring loaded so as to provide constant tension on said wire strand rope whereby said rope and said curtain sections are held taut both in the fully extended position of the roof and positions moving to or from such fully raised position.

6. A building structure adapted to be located partially or entirely below the adjacent terrain, comprising:

(a) wall means defining a large, open enclosure, said wall means being located at least partially below the adjacent terrain;

(b) frame means positioned above said wall means;

(c) roof means above said frame means and, when closed, entirely covering said enclosure, said roof means including a weather resistant top surface, a moisture resistant bottom surface, and insulation means disposed between said surfaces, (d) means for mounting said roof for movement relative to said frame so as to selectively expose said enclosure to natural light;

(e) means for moving said roof;

(f) ventilating means communicating with the enclosure for delivering ambient air to the enclosure and venting air therefrom, said ventilating means comprising an inlet duct communicating with said enclosure and with ambient air above the level of the adjacent terrain, and an exhaust duct communicating with the enclosure at one end and with the atmosphere at its opposite end, and fan means associated with said inlet duct for forced circulation of said ambient air to and through said enclosure;

(g) artificial lighting means mounted within said enclosure adjacent the top thereof, whereby artificial lighting can be provided as desired when said roof is partially or entirely closed;

(h) supplemental heating means closely associated with said fan means whereby ambient air is forced by said fan means over said supplemental heating means for heating said enclosure, and wherein said means for mounting said roof for movement relative to said frame comprises hinge plates formed on said frame at opposite sides thereof, and hinge pins provided on said roof and extending through openings provided in said hinge plates, whereby said roof can be raised above an axis through said pin means.

7. The building structure of claim 6 wherein said means for moving said roof comprises a lifting rod mounted at each side of said roof, the upper end of each rod being pivotally secured to said roof, and the lower end of each rod being mounted for rolling movement along said frame means.

8. The building structure of claim 7 wherein the lower end of each rod is positioned around a shaft extending transversely of said frame means, said shaft being provided at each end thereof with a roller adapted to contact laterally extending bottom flange portions of supporting beams for rolling movement therealong, and drive means for moving said shaft and thus said rollers along said lateral flanges for moving the bottom of said lifting rod relative to the top, thereby resulting in the raising of said roof.

9. The building structure of claim 8 wherein said drive means for said shaft comprises a drive motor, sprocket means, at least one of which is driven by said drive motor, and sprocket chain means disposed around said sprocket means, one of said sprocket chains being welded to a sleeve positioned around said shaft whereby movement of said sprocket chain by said drive means effects longitudinal movement of said shaft and thus said roller along said flange means, thereby raising said roof.

10. The building structure of claim 9 wherein the upper end of said lifting rod is operatively connected to said roof by means of a stub shaft secured to a side flange forming part of the roof structure, and means for retaining the upper end of said lifting rod on said stub shaft.

11. A building structure adapted to be located partially or entirely below the adjacent terrain, comprising:

(a) wall means defining a large, open enclosure, said wall means being located at least partially below the adjacent terrain;

(b) frame means positioned above said wall means;

(c) roof means above said frame means and, when closed, entirely covering said enclosure, said roof means comprising a weather resistant top sheet, a moisture-proof bottom sheet, both of which extend the full dimension of said roof; and a layer of insulation positioned between said sheets so as to form a sandwich type construction, (d) means for mounting said roof for movement relative to said frame so as to selectively expose said enclosure to natural light;

(e) means for moving said roof;

(f) ventilating means communicating with the enclosure for delivering ambient air to the enclosure and venting air therefrom, said ventilating means comprising an inlet duct communicating with said enclosure and with ambient air above the level of the adjacent terrain, and an exhaust duct communicating with the enclosure at one end and with the atmosphere at its opposite end, and fan means associated with said inlet duct for forced circulation of said ambient air to and through said enclosure, and (g) artificial lighting means mounted within said enclosure adjacent the top thereof, whereby artificial lighting can be provided as desired when said roof is partially or entirely closed.

12. The roof of claim 11 wherein the side and one end of said roof are bevelled for engagement with complementary bevelled surfaces formed on said frame means at the sides and associated end thereof, thereby to provide a tight fitting surface when said roof is moved to a closed position.

13. The building structure of claim 11 further including latch means for retaining said roof in a closed position, said latch means comprising a latch member carried by said frame means, and a pin carried by said roof over which said latch member can extend for preventing the raising of said roof.

14. A building structure adapted to be located partially or entirely below the adjacent terrain, comprising:
(a) wall means defining an enclosure, said wall means being located at least partially below the adjacent terrain;
(b) frame means positioned above said wall means;
(c) a roof above said frame means, and, when closed, entirely covering said enclosure;
(d) means for mounting said roof for movement relative to said frame so as to selectively expose said enclosure to natural light, said means for mounting said roof relative to said frame comprising a hinge assembly by means of which said roof can be raised from said frame about an axis through said hinge assembly;
(e) means for moving said roof, and
(f) shield means extending between said roof and said frame means when said roof is raised, thereby providing a wind and weather resistant shield to said enclosure.

15. The building structure of claim 14 wherein said shield means comprises curtain means in the form of a plurality of translucent, flexible plastic sections extending transversely at the free end of said roof and longitudinally along the sides of said roof, and means for interconnecting said sections in a weather tight manner.

16. The building structure of claim 15 wherein said interconnecting means comprises a snap ring to which is connected grommet means secured to reinforced side edges of each curtain section, with one of said reinforced edges extending over said ring so as to provide a weather tight seal, and further including reinforcing means in the form of wire strand ropes extending with said rings and thus between adjacent curtain sections, one end of each wire strand rope being secured to said roof, and the opposite end being secured to a pulley mounted on said frame, said pulley being spring loaded so as to provide constant tension on said wire strand rope whereby said rope and said curtain sections are held taut both in the fully extended position of the roof and positions moving to or from such fully raised position.

* * * * *